US012754566B2

(12) United States Patent
Yao et al.

(10) Patent No.: US 12,754,566 B2
(45) Date of Patent: Oct. 6, 2026

(54) METHOD AND APPARATUS FOR DETERMINING MOWER PATH, AND ELECTRONIC DEVICE

(71) Applicant: WILLAND (BEIJING) TECHNOLOGY CO., LTD., Beijing (CN)

(72) Inventors: Zhuo Yao, Beijing (CN); Degan Lin, Beijing (CN)

(73) Assignee: WILLAND (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/871,174

(22) PCT Filed: Aug. 22, 2023

(86) PCT No.: PCT/CN2023/114292
§ 371 (c)(1),
(2) Date: Dec. 3, 2024

(87) PCT Pub. No.: WO2024/041538
PCT Pub. Date: Feb. 29, 2024

(65) Prior Publication Data
US 2026/0023393 A1 Jan. 22, 2026

(30) Foreign Application Priority Data
Aug. 23, 2022 (CN) ......................... 202211014227.2

(51) Int. Cl.
*G05D 1/648* (2024.01)
*G05D 105/15* (2024.01)
*G05D 107/20* (2024.01)

(52) U.S. Cl.
CPC ....... *G05D 1/6482* (2024.01); *G05D 2105/15* (2024.01); *G05D 2107/23* (2024.01)

(58) Field of Classification Search
CPC ............... G05D 1/6482; G05D 1/0221; G05D 2105/15; G05D 2107/23; G05D 2109/10; G05D 1/0278; G05D 1/028; G05D 1/0285
See application file for complete search history.

(56) References Cited

U.S. PATENT DOCUMENTS

| | | | |
|---|---|---|---|
| 8,498,788 | B2 | 7/2013 | Kondekar |
| 10,459,447 | B2 | 10/2019 | Foster |

(Continued)

FOREIGN PATENT DOCUMENTS

| | | |
|---|---|---|
| CN | 106708060 A | 5/2017 |
| CN | 109634287 A | 4/2019 |

(Continued)

OTHER PUBLICATIONS

CN 112148813 B with English translation; date filed Jun. 27, 2019; date published Feb. 7, 2025; all pages. (Year: 2025).*

(Continued)

*Primary Examiner* — Calvin Cheung
(74) *Attorney, Agent, or Firm* — Cooper Legal Group, LLC

(57) ABSTRACT

A method and an apparatus for determining a mower path, an electronic device, a computer storage medium and a computer program are disclosed. The method for determining a mower path includes that: dividing a target mowing area into a plurality of convex sub-areas (S210); determining a main extension direction of each of the plurality of convex sub-areas as a mowing direction (S220); determining mowing paths of the plurality of convex sub-areas based on the respective mowing directions of the plurality of convex sub-areas (S230); and determining the mower path in the target mowing area based on the mowing paths of the plurality of convex sub-areas (S240). According to the solution of embodiments of the present disclosure, frequent (Continued)

direction changing of the mower in a narrow area is avoided, time consumption is reduced and the working efficiency of the mower is improved.

12 Claims, 6 Drawing Sheets

(56) References Cited

U.S. PATENT DOCUMENTS

| | | | | |
|---|---|---|---|---|
| 2004/0193349 | A1 | 9/2004 | Flann | |
| 2012/0101725 | A1 * | 4/2012 | Kondekar ............ | G05D 1/0219 701/445 |
| 2018/0364726 | A1 | 12/2018 | Foster et al. | |
| 2020/0023973 | A1 | 1/2020 | Xu et al. | |
| 2021/0240187 | A1 | 8/2021 | Barboi et al. | |
| 2021/0286368 | A1 * | 9/2021 | Jung ..................... | A01D 34/008 |

FOREIGN PATENT DOCUMENTS

| | | | |
|---|---|---|---|
| CN | 109658432 | A | 4/2019 |
| CN | 111307156 | A | 6/2020 |
| CN | 111448530 | A | 7/2020 |
| CN | 111562787 | A | 8/2020 |
| CN | 112148813 | A | 12/2020 |
| CN | 112306050 | A | 2/2021 |
| CN | 112445212 | A | 3/2021 |
| CN | 113219995 | A | 8/2021 |
| CN | 113534822 | A | 10/2021 |
| CN | 113671973 | A | 11/2021 |
| CN | 113985866 | A | 1/2022 |
| CN | 114600622 | A | 6/2022 |
| CN | 114690753 | A | 7/2022 |
| CN | 114859887 | A | 8/2022 |
| CN | 114868095 | A | 8/2022 |
| CN | 115237144 | A | 10/2022 |
| EP | 3912449 | A1 | 11/2021 |
| EP | 4293465 | A2 | 12/2023 |
| KR | 20160128123 | A1 | 11/2016 |
| WO | 2022061207 | A1 | 3/2022 |

OTHER PUBLICATIONS

WO 2016002246 A1 with English translation; date published Jan. 7, 2016; all pages. (Year: 2016).*

Definition or Plain Meaning for "Convex" from https://www.merriam-webster.com/dictionary/convex (Year: 2026).*

Nielsen Lasse Damtoft et al: "Convex Decomposition for a Coverage Path Planning for Autonomous Vehicles: Interior Extension of Edges", Sensors 2019, vol. 19, No. 19, Sep. 25, 2019 (Sep. 25, 2019), p. 4165, XP093021914, DOI: 10.3390/s19194165. Abstract, Chapter 1.

Supplementary European Search Report in the European application No. 23856627.7, mailed on Feb. 25, 2025. 9 pages.

International Search Report in the international application No. PCT/CN2023/114292, mailed on Dec. 10, 2023, 5 pages.

Written Opinion of the International Search Authority in the international application No. PCT/CN2023/114292, mailed on Dec. 10, 2023, 4 pages.

* cited by examiner

METHOD AND APPARATUS FOR DETERMINING MOWER PATH, AND ELECTRONIC DEVICE

CROSS-REFERENCE TO RELATED APPLICATION

This is a national phase application of International Application No. PCT/CN2023/114292, filed on Aug. 22, 2023, which claims priority to Chinese Patent Application No. 202211014227.2 filed on Aug. 23, 2022. The entire contents of International Application No. PCT/CN2023/114292 and Chinese Patent Application No. 202211014227.2 are incorporated herein by reference in their entireties.

TECHNICAL FIELD

The present disclosure relates to the field of computer technology, in particular to a method and an apparatus for determining a mower path and an electronic device.

BACKGROUND

A mower covers a working area by covering a path, so as to mow in the working area. The mower generally works in a relatively closed area, and is required to be intelligent enough to complete autonomously path planning/determining and complete mowing of the whole area with a low repetition rate. This path planning manner is called complete coverage path planning. As a manner of path planning, the complete coverage path planning requires a path that can completely cover the whole reachable area. According to different strategies, the complete coverage path planning can include a random path planning and non-random path planning. The random path planning does not rely on precise positioning, and is prone to missing cutting and repeated cutting in some areas and corners, with a low working area coverage, long time consumption and low efficiency. The non-random path planning relies on positioning for path planning. Compared with the random path planning, the non-random path planning has a greater working coverage, shorter time consumption and higher efficiency.

At present, most mowers adopt this non-random path planning in the complete coverage path planning for the mowing path planning, such that the path planning completely covers all areas without obstacles in the working environment. However, for an area with a complex shape, especially for a narrow area, there is no special path planning method. When the mower works in a narrow area, the mower still needs to switch directions back and forth many times even if the non-random path planning in the complete coverage path planning is adopted, which takes a long time and has a low working efficiency.

In view of the above technical problems, there is no effective solution in the related art.

SUMMARY

In view of this, embodiments of the present disclosure provide a method and an apparatus for determining a mower path, and an electronic device, so as to at least solve the above problems partially.

According to a first aspect of the present disclosure, a method for determining a mower path is provided. The method includes the following operations. A target mowing area is divided into a plurality of convex sub-areas. A main extension direction of each of the plurality of convex sub-areas is determined as a mowing direction. Mowing paths of the plurality of convex sub-areas are determined based on the respective mowing directions of the plurality of convex sub-areas. The mower path in the target mowing area is determined based on the mowing paths of the plurality of convex sub-areas.

In another implementation of the present disclosure, before dividing the target mowing area into the plurality of convex sub-areas, the method further includes the following operations. A mower provided with a positioning device is controlled to move and multiple mower positioning positions of the mower are obtained. An area surrounding the plurality of mower positioning positions is determined as the target mowing area.

In another implementation of the present disclosure, the operation that the target mowing area is divided into the plurality of convex sub-areas includes the following operations. An obstacle area in the target mowing area is determined. The target mowing area is divided into the plurality of convex sub-areas based on a boundary of the obstacle area and an outer boundary of the target mowing area.

In another implementation of the present disclosure, the operation that the target mowing area is divided into the plurality of convex sub-areas based on the boundary of the obstacle area and the outer boundary of the target mowing area includes the following operations. A fitting boundary for the boundary of the obstacle area is determined, where the fitting boundary has a direction consistency with the outer boundary of the target mowing area. An area to be divided surrounded by the fitting boundary and the outer boundary of the target mowing area is determined. The area to be divided is divided based on the direction consistency between the fitting boundary and the outer boundary of the target mowing area, to obtain the plurality of convex sub-areas.

In another implementation of the present disclosure, the operation that the area to be divided is divided based on the direction consistency between the fitting boundary and the outer boundary of the target mowing area, to obtain the plurality of convex sub-areas includes the following operations. At least one reference line having direction consistency with the fitting boundary and the outer boundary of the target mowing area is determined. The area to be divided is divided into the plurality of convex sub-areas based on the at least one reference line.

In another implementation of the present disclosure, the operation that the target mowing area is divided into the plurality of convex sub-areas based on the boundary of the obstacle area and the outer boundary of the target mowing area includes the following operations. A fitting polygon enclosing the obstacle area is determined. An area to be divided surrounded by the fitting polygon and the outer boundary of the target mowing area is determined. The area to be divided is divided into the plurality of convex sub-areas based on a plurality of vertices of the fitting polygon.

In another implementation of the present disclosure, the operation that the main extension direction of each of the plurality of convex sub-areas is determined as the mowing direction includes the following operations. An envelope rectangle of each of the plurality of convex sub-areas is determined, and a long side direction of the envelope rectangle is determined as the mowing direction.

In another implementation of the present disclosure, the operation that the mower path in the target mowing area is determined based on the mowing paths of the plurality of convex sub-areas includes the following operations. A mower moving path among the plurality of convex sub-areas is determined. The mowing paths of the plurality of convex sub-areas are connected with the mower moving path to obtain the mower path in the target mowing area.

In another implementation of the present disclosure, the operation that the mower moving path among the plurality of convex sub-areas is determined includes the following operations. A starting point and an ending point of a mowing path of each of the plurality of convex sub-areas are determined. Starting points and ending points of different convex sub-areas are connected to obtain the mower moving path.

In another implementation of the present disclosure, the operation that the starting points and the ending points of the different convex sub-areas are connected to obtain the mower moving path includes the following operations. The starting points and the ending points of the different convex sub-areas are connected to obtain a plurality of candidate mower moving paths. An optimal mower moving path is selected from the plurality of candidate mower moving paths as the mower moving path.

In another implementation of the present disclosure, the operation that the starting points and the ending points of the different convex sub-areas are connected to obtain the plurality of candidate mower moving paths, and the optimal mower moving path is selected as the mower moving path from the plurality of candidate mower moving paths includes the following operations. A current sub-area among the plurality of convex sub-areas is determined. A starting point and an ending point of the current sub-area are determined. An unsearched sub-area having a starting point closest to the ending point of the current sub-area is determined as a next sub-area. A moving subpath obtained by connecting the ending point of the current sub-area with the starting point of the next sub-area is recoded. The current sub-area is updated based on the next sub-area until there is no unsearched sub-area. The mower moving path is determined based on the recorded moving subpaths.

According to a second aspect of the present disclosure, an apparatus for determining a mower path is provided. The apparatus for determining the mower path includes a dividing module, a first determining module, a second determining module, and a third determining module. The dividing module is configured to divide a target mowing area into a plurality of convex sub-areas. The first determining module is configured to determine a main extension direction of each of the plurality of convex sub-areas as a mowing direction. The second determining module is configured to determine mowing paths of the plurality of convex sub-areas based on the respective mowing directions of the plurality of convex sub-areas. The third determining module is configured to determine the mower path in the target mowing area based on the mowing paths of the plurality of convex sub-areas.

According to a third aspect of the present disclosure, there is provided an electronic device, including a processor and a memory for storing programs. The programs include instructions that, when executed by the processor, cause the processor to perform the method as described in the first aspect.

According to a fourth aspect of the present disclosure, there is provided a computer storage medium having stored thereon a computer program. The computer program, when executed by a processor, causes the processor to implement the method as described in the first aspect.

According to a fifth aspect of the present disclosure, there is provided a computer program including computer executable instructions. The computer executable instructions, when executed by a processor, cause the processor to implement the method as described in the first aspect.

In the solution of the embodiments of the present disclosure, the main extending direction of each of a plurality of convex sub-areas is taken as the mowing direction, and mowing based on the mowing direction in the convex sub-area is beneficial to reduce the frequency of changing the direction of the mower in the mowing operation, thereby improving the working efficiency of the mower.

BRIEF DESCRIPTION OF THE DRAWINGS

In order to describe the technical solutions in the embodiments of the disclosure or the related art more clearly, the drawings required to be used in descriptions on the embodiments or the related art will be simply introduced below. It is apparent that the drawings in the following descriptions are only some embodiments of the disclosure. Those of ordinary skilled in the art may further obtain other drawings according to these drawings.

REFERENCES

- 10: mower; 20: remote control; 11: moving module; 12: positioning module; 13: path processing module; 14: mowing execution module.
- 610: dividing module; 620: first determining module; 630: second determining module; 640: third determining module; 702: processor; 704: communication interface; 706: memory; 708: communication bus; 710: program.

DETAILED DESCRIPTION

In order to make those skilled in the art to better understand the technical solutions in the embodiments of the present disclosure, the technical solutions in the embodiments of the disclosure will be described clearly and completely below in combination with the drawings in the embodiments of the disclosure. It is apparent that the described embodiments are not all embodiments but part of embodiments of the disclosure.

As used herein, "exemplary/illustrative" means "serving as an instance, an example, or illustration", and any illustration, implementation described herein as "exemplary/illustrative" should not be interpreted as a more preferred or advantageous technical solution. For the sake of brevity, the drawings only illustrate the parts relevant to the present disclosure schematically, and the parts do not represent the actual structure as a product. In addition, in order to make the drawings concise and easy to understand, only one or more components with the same structure or function are schematically depicted or indicated in some drawings. Based on the embodiments in the present disclosure, all other embodiments obtained by those of ordinary skill in the art shall fall within the scope of protection of the embodiments of the present disclosure.

The detailed implementation of the embodiments of the present disclosure is further described below in conjunction with the drawings of the embodiments of the present disclosure.

Figure 1:
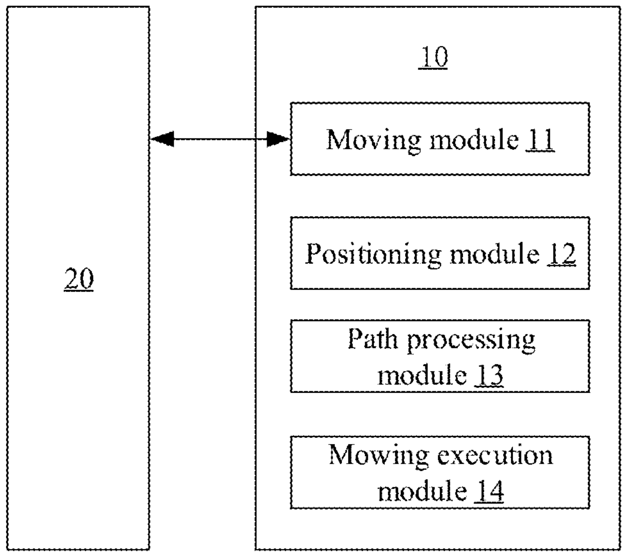
FIG. 1 is an example architectural diagram of a communication system of a mower.

FIG. 1 is an example architectural diagram of a communication system of a mower 10. The communication system of the mower 10 includes the mower 10 and a remote control 20. The mower 10 may move by receiving one or more instructions from the remote control 20 by a positioning module 12 and a moving module 11. The mower 10 may also acquire current geographic location information based on the positioning module 12 such as GPS positioning. The moving module 11 may also perform movement based on the acquired geographic location information. The movement of the mower 10 may correspond to a mowing mode and a non-mowing mode. In the mowing mode, the mower 10 performs mowing with a mower structure/mechanism provided with vanes or blades while moving. In the non-mowing mode, the mower structure/mechanism can be retracted and enter into a non-working state, and the mower 10 moves to the next mowing position based on the moving module 11.

In another example, the mower 10 may also perform mowing based on a preset mower path. The mower path may include a mowing path corresponding to the mowing mode and a moving path corresponding to the non-mowing mode. The mower 10 may acquire the preset mower path directly, or may calculate and acquire the mower path by other input data. For example, the path processing module 13 obtains the input data, executes the path calculation, and outputs the mower path. Then, the mower 10 is controlled by the mowing execution module 14 to enter the mowing mode to mow along the mower path, or enter the non-mowing mode to move along the moving path.

Figure 2:
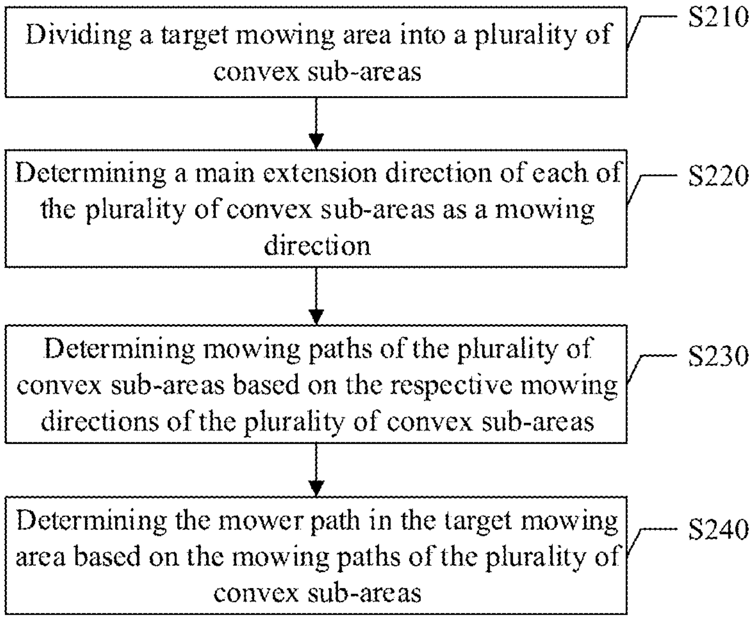
FIG. 2 is a schematic flowchart of a method for determining a mower path according to an embodiment of the present disclosure.

FIG. 2 is a schematic flowchart of a method for determining a mower path according to an embodiment of the present disclosure. As illustrated in FIG. 2, the embodiment mainly includes the following operations.

At S210, a target mowing area is divided into a plurality of convex sub-areas.

It should be understood that data indicating the target mowing area may be acquired. The data indicating the target mowing area may be pre-generated by the mower, or may be acquired from a cloud or other electronic device by the mower.

For example, a cloud database stores information of all local areas to be mowed, and the mower provided with a positioning device acquires boundary information of the target mowing area and an obstacle at the current positioning position from the cloud database.

For another example, the cloud database stores the information of all local areas to be mowed, and the remote control 20 (e.g., a mobile phone) acquires the boundary information of the target mowing area and the obstacle at the current positioning position from the cloud database and transmits the boundary information to the mower provided with the positioning device.

It should also be understood that a convex sub-area in the present disclosure may be a convex polygon or other convex sub-area enclosed by a closed convex curve. In other words, the convex polygon is a simple polygon with a convex set inside the polygon. By a convex polygon, it means that if any of the sides of a polygon is extended infinitely in both sides into a straight line, and all the other sides of the polygon are on the same side of the straight line, then the polygon is called a convex polygon. All interior angles of the convex polygon should not be reflex angles, and the line segment between any two vertices is located inside or on a side of the polygon. Each interior angle of the convex polygon is less than or equal to 180°, and a sum of interior angles of a convex polygon with n sides (n belongs to Z and n is greater than 2) is $(n-2)\times180°$, but a sum of exterior angles of any convex polygon is 360°. It can be proved by disproof that the number of acute angles in the interior angles of the convex polygon cannot be more than 3. All diagonals of the convex polygon are inside the convex polygon. A convex polygon with n sides has the number of diagonal lines $n(n-3)/2$, where any vertex can be diagonally connected to the remaining $n-3$ vertices.

At S220, a main extension direction of each of the plurality of convex sub-areas is determined as a mowing direction.

For example, the main extension direction may be a direction of the longest line segment that can be intercepted in a convex sub-area. In other words, for a given convex sub-area, the longer the line segment corresponding to the main extension direction, the less the number of mowing turns. Accordingly, the minimum number of mower turns may be obtained by taking the main extension direction as the mowing direction.

In addition, the main extension direction may pass through the axisymmetric envelope polygon of a convex sub-area, and correspondingly, the direction where the axis of symmetry lies is the main extension direction.

At S230, mowing paths of the plurality of convex sub-areas are determined based on the respective mowing directions of the plurality of convex sub-areas.

For example, mowing may be performed along the mowing direction or performed at an angle to the mowing direction.

At S240, the mower path in the target mowing area is determined based on the mowing paths of the plurality of convex sub-areas.

For example, if distances among the plurality of convex sub-areas are small, or if the plurality of convex sub-areas is distribution centrally, the mowing paths of the plurality of convex sub-areas may be determined as the mower path. In other words, the moving path of the mower when the mower does not perform mowing may be ignored.

For another example, a moving path of the mower among the plurality of convex sub-areas may be determined, and the mower path may be determined based on both the mowing paths and the moving path.

In an example, the mower path may be obtained by connecting mowing paths within the plurality of convex sub-areas directly or indirectly. For example, a mowing path in each convex sub-area includes a starting point and an end point, and a complete mower path is obtained by connecting the starting points and end points of mowing paths in different convex sub-areas. It should be understood that an end point of a mowing path in a convex sub-area may be connected to a starting point of a mowing path of, such as an adjacent convex sub-area, thereby moving from one convex sub-area to another convex sub-area. The mower may be in the mowing mode when moving in a mowing path of the same convex sub-area, and may be in the non-mowing mode when moving in different convex sub-areas.

In the solution of the embodiments of the present disclosure, the main extending direction of each of the plurality of convex sub-areas is taken as the mowing direction. Mowing based on the mowing direction in each convex sub-area is beneficial to reduce the frequency of changing the direction of the mower in the mowing operation, and improve the working efficiency of the mower.

Figure 4A:
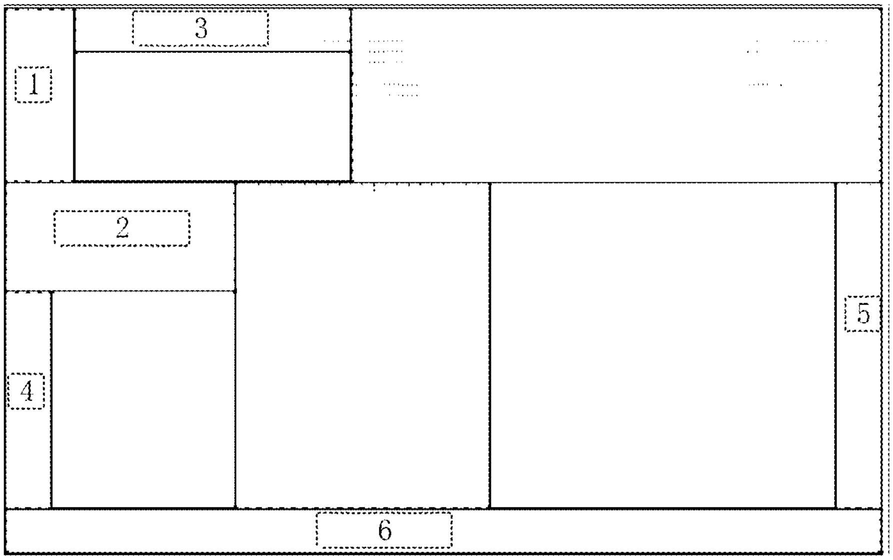
FIG. 4A to FIG. 4B are schematic diagrams of processes for determining mowing directions of the embodiment of FIG. 2.

Specifically, when the target mowing area is of a regular shape, referring to an example in which the sub-areas 1, 2, 3, 4, 5, and 6 are all convex sub-areas in FIG. 4A, the mower may be in the mowing mode when moving within the sub-areas 1, 2, 3, 4, 5, and 6, respectively. The mower may be in the non-mowing mode when moving from the current sub-area (such as, sub-area 1) to another sub-area (such as, sub-area 2), so as to avoid collision with obstacles when it is too close to obstacles and wear of the mower structure/mechanism provided with vanes or blades during the moving process of the mower.

Figure 4B:
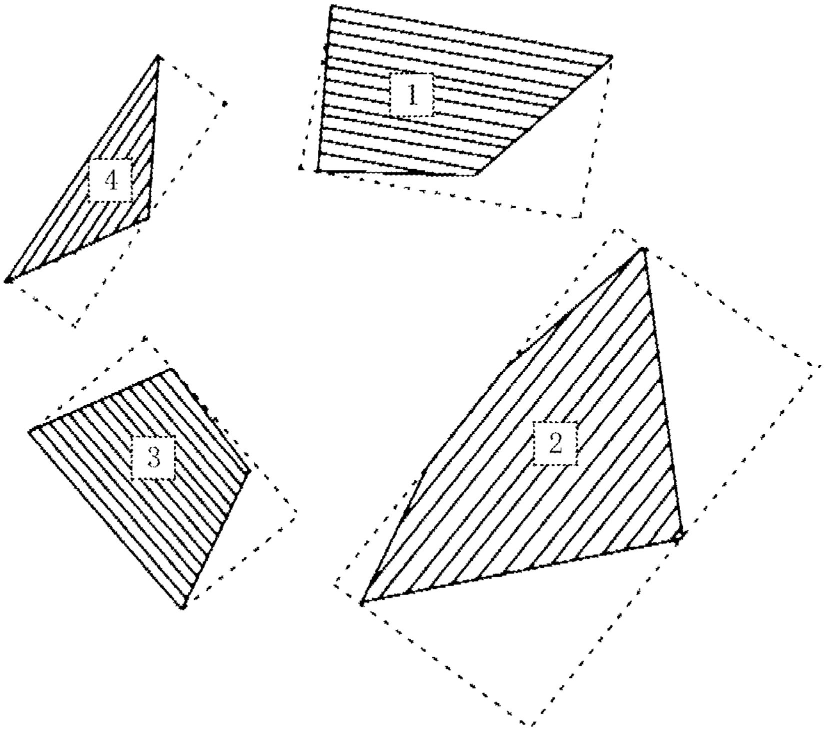

In an example, when the target mowing area is of an irregular shape, referring to an example in which the sub-areas 1, 2, 3, 4 are all convex sub-areas in FIG. 4B, the mower may be in the mowing mode when moving within the sub-areas 1, 2, 3, 4, respectively. Since there are spaced paths between the divided sub-areas, when the mower moves from the current sub-area (e.g., sub-area 1) to another sub-area (e.g., sub-area 2), the mower is in the non-mowing mode in the spaced path.

Figure 5A:
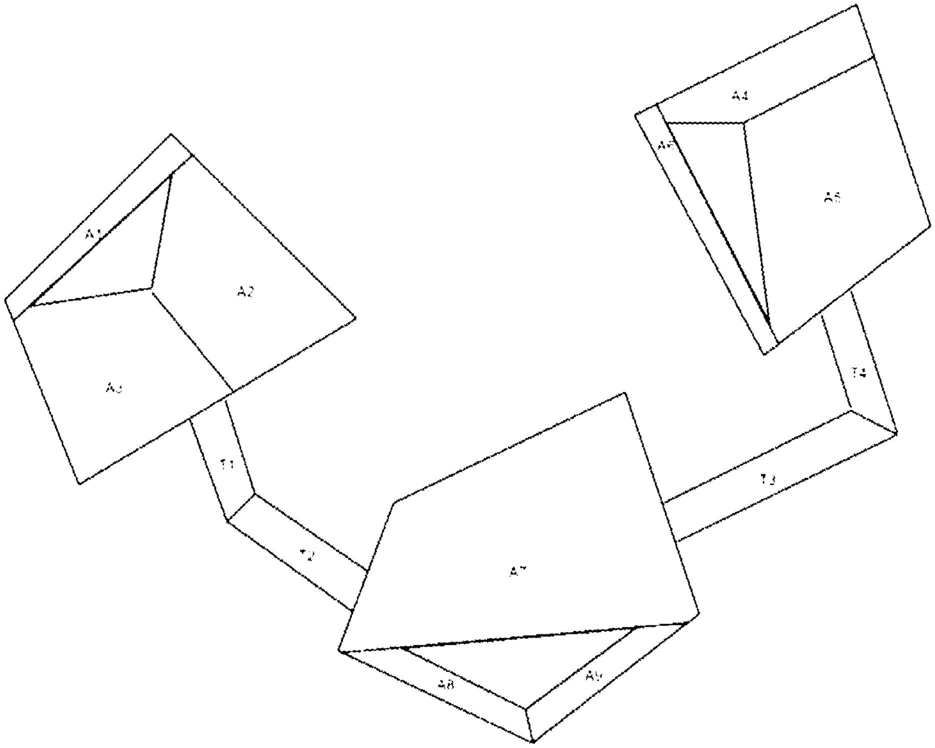
FIG. 5A to FIG. 5C are schematic diagrams of processes for determining a mower path of the embodiment of FIG. 2.

In an example, when the target mowing area is of an irregular shape, referring to FIG. 5A, the target mowing area includes sub-areas A1, A2, A3, A4, A5, A6, A7 and mowing channels T1, T2, T3, T4. The mowing channels divide the convex sub-areas, and the mower may move directly along the direction of the mowing channel, so that the mower may be in the mowing mode when moving in the sub-areas A1, A2, A3, A4, A5, A6, A7 and the mowing channels T1, T2, T3, T4. Since the distances among the plurality of convex sub-areas in FIG. 5A are small and the distribution of the plurality of convex sub-areas is concentrated, the mowing paths of the plurality of convex sub-areas may be determined as the mower path. In other words, the moving path when the mower does not perform mowing may be ignored, that is, when the mower moves from the current sub-area (e.g., sub-area A3) to the mowing channel (e.g., sub-area T1), the mower may be in the mowing mode in the spaced path.

When the target mowing area is of an irregular shape, all vertices of an obstacle are selected based on the boundary information of the obstacle, and all the vertices of the obstacle are connected with the vertices on boundary lines of the target mowing area to generate the plurality of convex sub-areas.

In an example, the operation that the main extension direction of each of the plurality of convex sub-areas is determined includes that an envelope rectangle of each of the plurality of convex sub-areas is calculated. A direction of the long side of the envelope rectangle is determined as the mowing direction. When the mowing area is fixed, such mowing direction makes a mowing path of each convex sub-area long relatively, and the total number of changing the direction of the mower in the mowing operation is small relatively.

In an example, the operation that the mower path in the target mowing area is determined based on the mowing paths of the plurality of convex sub-areas includes the following operation. The mowing paths of the plurality of convex sub-areas are connected through the mower moving path among the plurality of convex sub-areas to obtain the mower path in the target mowing area.

In an example, the operation that the mower moving path among the plurality of convex sub-areas is determined includes the following operations. The mowing path of each of the plurality of convex sub-areas has a starting point and an end point. Starting points and ending points of different convex sub-areas are connected to obtain a plurality of candidate/alternative mower moving paths, and a shortest mower moving path is selected from the plurality of candidate mower moving paths as the mower moving path.

In other examples of the mower, before the target mowing area is divided into the plurality of convex sub-areas, the mower provided with a positioning device is controlled to move and a plurality of mower positioning positions of the mower are obtained; and an area enclosing the plurality of mower positioning positions is determined as the target mowing area, which improves the calculation accuracy of the target mowing area and facilitates accurate path planning. An environmental map for mowing by the mower is established based on the relationship among multiple mower positioning positions. The target mowing area of the mower and the boundary information of one or more obstacles are determined based on the environmental map.

In other examples, as an example of dividing the target mowing area into the plurality of convex sub-areas, an obstacle area in the target mowing area is determined; and the target mowing area is divided into the plurality of convex sub-areas based on a boundary of the obstacle area and an outer boundary of the target mowing area, thereby avoiding the influence of obstacles in the determined path. The obstacle area may include one or more obstacles.

Figure 3A:
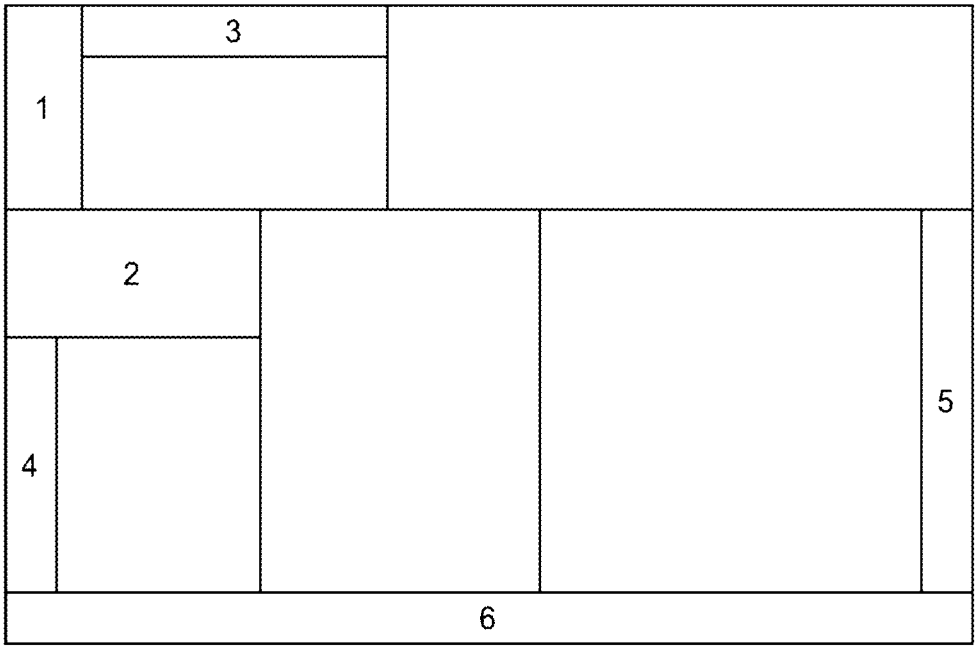
FIG. 3A to FIG. 3B are schematic diagrams of processes for dividing convex sub-areas of the embodiment of FIG. 2.

Returning again to FIG. 3A, when the target mowing area is of a regular shape, a plurality of vertices of an obstacle that are close to the boundary side of the target mowing area are selected based on the boundary information of the obstacle, and the plurality of vertices are connected with the boundary lines of the target mowing area to generate the plurality of convex sub-areas. Sub-areas 1, 2, 3, 4, 5, and 6 are examples of convex sub-areas.

In a specific example, the target mowing area is divided into the plurality of convex sub-areas based on the boundary of the obstacle area and the outer boundary of the target mowing area as follows. A fitting boundary for the boundary of the obstacle area is determined, such that the determined fitting boundary has a direction consistency with the outer boundary of the target mowing area. An area to be divided surrounded by the fitting boundary and the outer boundary of the target mowing area is determined. The area to be divided is divided based on the direction consistency between the fitting boundary and the outer boundary of the target mowing area, to obtain the plurality of convex sub-areas. The direction consistency is beneficial to the division efficiency of sub-areas, and the direction consistency is also an important element of the boundary of convex sub-areas.

In other examples, the area to be divided is divided based on the direction consistency between the fitting boundary and the outer boundary of the target mowing area as follows. At least one reference line having direction consistency with the fitting boundary and the outer boundary of the target mowing area is determined. The area to be divided is divided into the plurality of rectangle sub-areas based on the at least one reference line. The determination of at least one reference line takes into account the fitting boundary, which avoids the influence of the obstacle area reliably, and ensures the direction consistency and boundary characteristics of convex sub-areas.

Figure 3B:
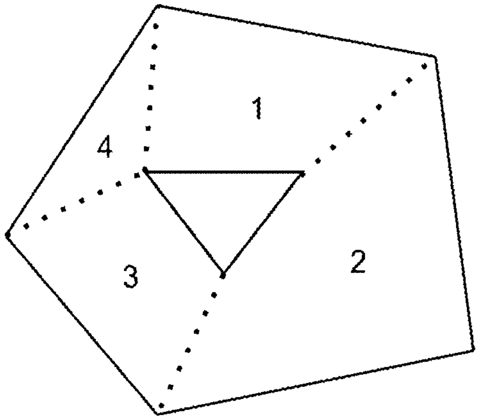

Returning again to FIG. 3B, specifically, when the target mowing area is of an irregular shape, a plurality of vertices of an obstacle that is close to the boundary side of the target mowing area are selected based on the boundary information of the obstacle, and the plurality of vertices are connected with the boundary lines of the target mowing area to generate the plurality of convex sub-areas. The sub-areas 1, 2, 3, and 4 are examples of convex sub-areas.

Returning again to FIG. 4B, the respective envelope rectangles of the sub-areas 1, 2, 3, and 4 are determined. An envelope rectangle includes a long side direction and a short side direction. When the envelope rectangle is a square, a length of the long side direction is equal to a length of the short side direction.

Figure 5B:
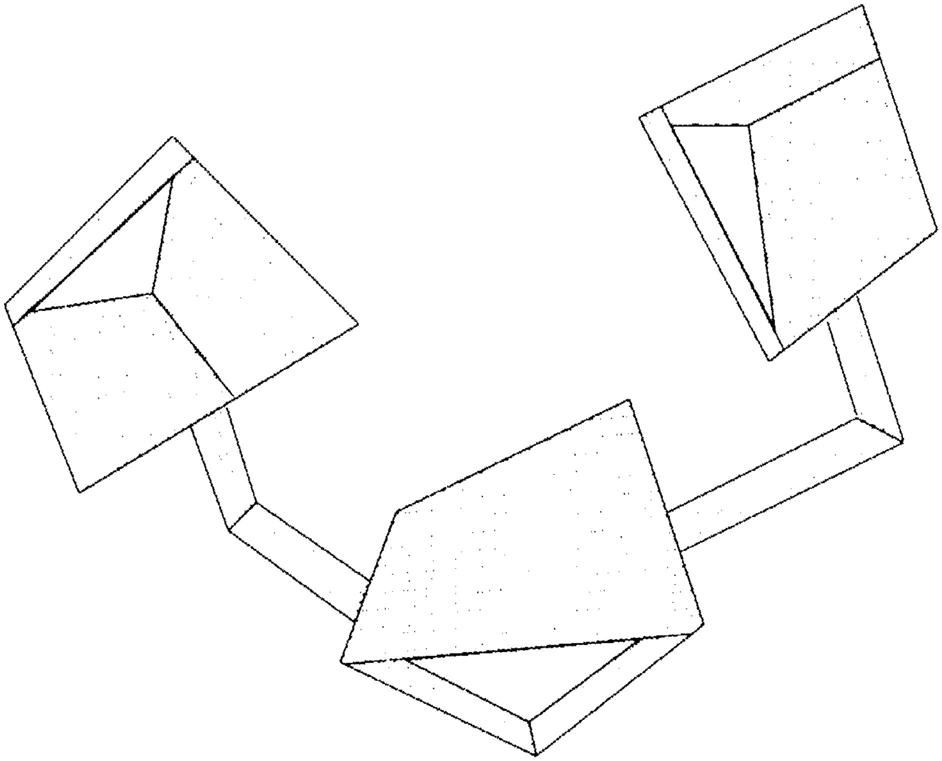

Returning again to FIG. 5A and FIG. 5B, FIG. 5A illustrates the determined sub-areas A1, A2, A3, A4, A5, A6 and A7, and mowing channels T1, T2, T3 and T4 determined correspondingly. The division of the convex sub-areas may be performed directly along the direction of the mowing channel, and further, the division of the convex sub-areas may be performed at an extreme point of a bending angle based on the bending angle of the mowing channel, which improves the division efficiency. Further, the final-determined mower path in the target mowing area is illustrated in FIG. 5B.

In other examples, the target mowing area is divided into the plurality of convex sub-areas based on the boundary of the obstacle area and the outer boundary of the target mowing area as follows. A fitting polygon enclosing the obstacle area is determined. An area to be divided surrounded by the fitting polygon and the outer boundary of the target mowing area is determined. The area to be divided is divided into the plurality of rectangle sub-areas based on a plurality of vertices of the fitting polygon. The fitting polygon encloses the obstacle area, which determines the area to be divided more definitely. Meanwhile, multiple vertices of the fitting polygon can be used as references for sub-areas division.

In other examples, the main extension direction of each of the plurality of convex sub-areas is determined as the mowing direction as follows. An envelope rectangle of each of the plurality of convex sub-areas is determined and a long side direction of the envelope rectangle is determined as the mowing direction. The envelope rectangle can determine the mowing direction accurately and efficiently. For example, the computation of the envelope rectangle may be configured as a computation interface, which facilitates to improve the determining efficiency of the mower path.

In other examples, the mower path in the target mowing area is determined based on the mowing paths of the plurality of convex sub-areas as follows. A mower moving path among the plurality of convex sub-areas is determined. The mowing paths of the plurality of convex sub-areas are connected with the mower moving path to obtain the mower path in the target mowing area. In such case, the mowing paths and the moving path are calculated respectively, and the moving path is calculated on the premise of ensuring the mowing path, which is beneficial to improving the mowing efficiency of the mower.

In other examples, the mower moving path among the plurality of convex sub-areas is determined as follows. A starting point and an ending point of a mowing path of each of the plurality of convex sub-areas are determined. Starting points and ending points of different convex sub-areas are connected to obtain the mower moving path, thus avoiding the repeated movement of the mower in the moving process and improving the moving efficiency of the mower.

In other examples, the starting points and the ending points of the different convex sub-areas are connected to obtain the mower moving path as follows. The starting points and the ending points of the different convex sub-areas are connected to obtain a plurality of candidate mower moving paths. A shortest mower moving path is selected from the plurality of candidate mower moving paths as the mower moving path, thus shortening the mower moving path and improving the moving efficiency of the mower.

It should be understood that determination of the mower path in the target mowing area can also be implemented using an optimized Dijkstra algorithm and an A* algorithm.

In other examples, the operation that the starting points and the ending points of the different convex sub-areas are connected to obtain the plurality of candidate mower moving paths, and the optimal mower moving path is selected from the plurality of candidate mower moving paths as the mower moving path includes the following operations. A current sub-area among the plurality of convex sub-areas is determined. A starting point and an ending point of the current sub-area are determined. An unsearched sub-area having a starting point closest to the ending point of the current sub-area is determined as a next sub-area. A moving subpath obtained by connecting the ending point of the current sub-area with the starting point of the next sub-area is recoded. The current sub-area is updated based on the next sub-area, for example, the next sub-area is determined as the current sub-area, until there is no unsearched sub-area. The mower moving path is determined based on the recorded moving subpaths.

Specifically, construction of connections among all convex sub-areas can be considered as determining a connection order among all mowing areas. There are two manners for determining the connection order among all mowing areas, including finding a local shortest path or finding a global shortest path. The manner of finding the local shortest path is to determine that a path for connecting a current area to the next area is the shortest path among the paths from an end point of the current area to each starting point of all unreached areas. This manner is convenient and quick with a definite result, but the determined path is not necessarily the global shortest path. The manner of finding the global shortest path is to determine an order for enabling the shortest total length of connected paths among all mowing areas. The manner of finding the global shortest path belongs to NP-hard problem, and there is no method to find the optimal solution at present. Traveling Salesman Problem (TSP) can be used to find a suboptimal solution, which takes more computational power, and provides an uncertain result.

Figure 5C:
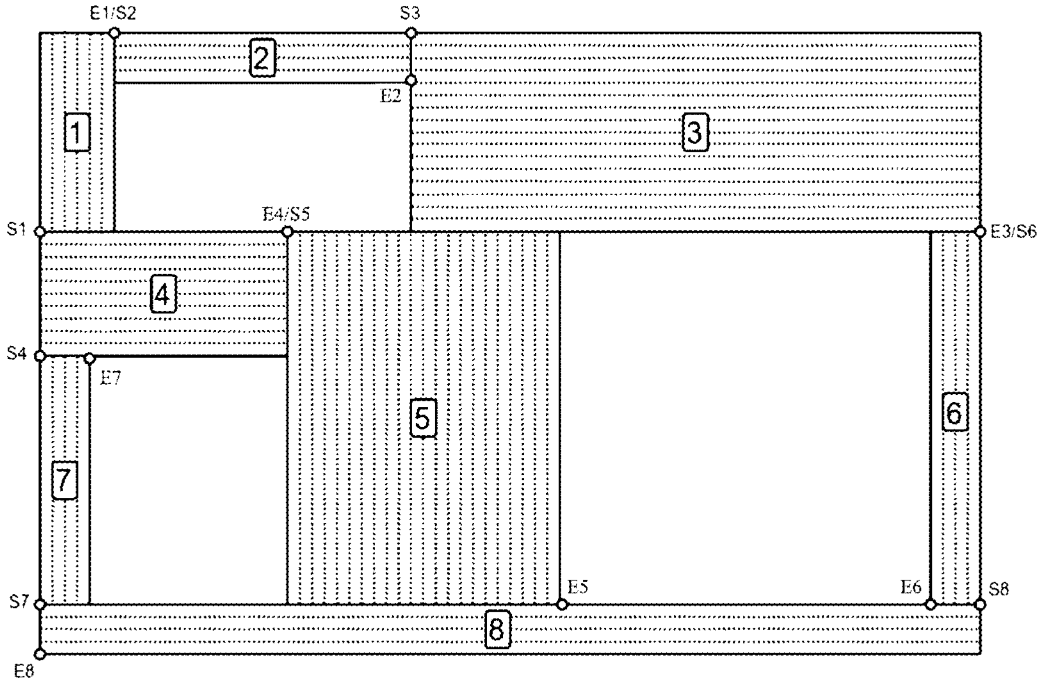

In the embodiments of the present disclosure, the manner of finding the local shortest path is adopted as an example. Referring to FIG. 5C, for example, the target mowing area is divided into eight convex sub-areas, where S is a starting point of each convex sub-area and E is an end point of each convex sub-area. Assuming that mowing starts from area 1, in paths from the end point E1 of the first area (i.e., area 1) to a starting point of each area that has not passed, E1 to S2 are the closest, so area 2 is selected as the second area. In paths from the end point E2 of the second area to a starting point of each area that has not passed, E2 to S3 are the closest, so area 3 is selected as the third area. In paths from the end point E3 of the third area to a starting point of each area that has not passed, E3 to S6 are the closest, so area 6 is selected as the fourth area. In paths from the end point E6 of the fourth area to a starting point of each area that has not passed, E6 to S8 are the closest, so area 8 is selected as the fifth area. In paths from the end point E8 of the fifth area to a starting point of each area that has not passed, E8 to S7 are the closest, so area 7 is selected as the sixth area. In paths from the end point E7 of the sixth area to a starting point of each area that has not passed, E7 to S4 are the closest, so area 4 is selected as the seventh area. In paths from the end point E4 of the seventh area to a starting point of each area that has not passed, E4 to S5 are the closest, so area 5 is selected as the eighth area.

After accessing all areas, the order of accessing all mowing areas is 1~2~3~6~8~7~4~5, and the obtained current subpaths are E1~S2, E2~S3, E3~S6, E6~S8, E8~S7, E7~S4 and E4~S8. Each current subpath is connected with repective mowing path of the plurality of convex sub-areas to obtain the mower path of the target mowing area.

Figure 6:
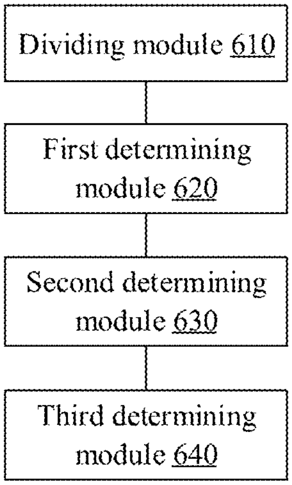
FIG. 6 is a schematic block diagram of an apparatus for determining a mower path according to another embodiment of the present disclosure.

FIG. 6 is a schematic block diagram of an apparatus for determining a mower path according to another embodiment of the present disclosure. The apparatus for determining the mower path may be deployed in a mower, and may also be deployed in a terminal or a server. The apparatus for determining the mower path of the embodiments in the present disclosure includes a dividing module 610, a first determining module 620, a second determining module 630 and a third determining module 640.

The dividing module 610 is configured to divide a target mowing area into a plurality of convex sub-areas.

The first determining module 620 is configured to determine a main extension direction of each of the plurality of convex sub-areas as a mowing direction.

The second determining module 630 is configured to determine mowing paths of the plurality of convex sub-areas based on the respective mowing directions of the plurality of convex sub-areas.

The third determining module 640 is configured to determine the mower path in the target mowing area based on the mowing paths of the plurality of convex sub-areas.

In the solution of the embodiments of the present disclosure, the main extending direction of each of a plurality of convex sub-areas is taken as the mowing direction. Mowing based on the mowing direction in the convex sub-area is beneficial to reduce the frequency of changing the direction of the mower in the mowing operation, thereby improving the working efficiency of the mower.

In other examples, the apparatus for determining the mower path further includes a positioning module and a fourth determining module. The positioning module is specifically configured to: control a mower provided with a positioning device to move and obtain a plurality of mower positioning positions of the mower. The fourth determining module is specifically configured to determine an area surrounding the plurality of mower positioning positions as the target mowing area.

In other examples, the dividing module 610 is specifically configured to: determine an obstacle area in the target mowing area; and divide the target mowing area into the plurality of convex sub-areas based on a boundary of the obstacle area and an outer boundary of the target mowing area.

In other examples, the dividing module 610 is specifically configured to: determine a fitting boundary for the boundary of the obstacle area, where the fitting boundary has a direction consistency with the outer boundary of the target mowing area; determine an area to be divided surrounded by the fitting boundary and the outer boundary of the target mowing area; and divide the area to be divided based on the direction consistency between the fitting boundary and the outer boundary of the target mowing area, to obtain the plurality of convex sub-areas.

In other examples, the dividing module 610 is specifically configured to: determine at least one reference line having direction consistency with the fitting boundary and the outer boundary of the target mowing area; and divide the area to be divided into the plurality of rectangle sub-areas based on the at least one reference line.

In other examples, the dividing module 610 is specifically configured to: determine a fitting polygon enclosing the obstacle area; determine an area to be divided surrounded by the fitting polygon and the outer boundary of the target mowing area; and divide the area to be divided into the plurality of rectangle sub-areas based on a plurality of vertices of the fitting polygon.

In other examples, the first determining module 620 is specifically configured to: determine an envelope rectangle of each of the plurality of convex sub-areas; and determine a long side direction of the envelope rectangle as the mowing direction.

In other examples, the third determining module 640 is specifically configured to: determine a mower moving path among the plurality of convex sub-areas; and connect the mowing paths of the plurality of convex sub-areas with the mower moving path to obtain the mower path in the target mowing area.

In other examples, the third determining module 640 is specifically configured to: determine a starting point and an ending point of a mowing path of each of the plurality of convex sub-areas; and connect starting points and ending points of different convex sub-areas to obtain the mower moving path.

In other examples, the third determining module 640 is specifically configured to: connect the starting points and the ending points of the different convex sub-areas to obtain a plurality of candidate mower moving paths; and select an optimal mower moving path from the plurality of candidate mower moving paths as the mower moving path.

In other examples, the third determining module 640 is specifically configured to: determine a current sub-area among the plurality of convex sub-areas; determine a starting point and an ending point of the current sub-area; determine an unsearched sub-area having a starting point closest to the ending point of the current sub-area as a next sub-area; record a moving subpath obtained by connecting the ending point of the current sub-area with the starting point of the next sub-area; update the current sub-area based on the next sub-area until there is no unsearched sub-area; and determine the mower moving path based on the recorded moving subpaths.

Figure 7:
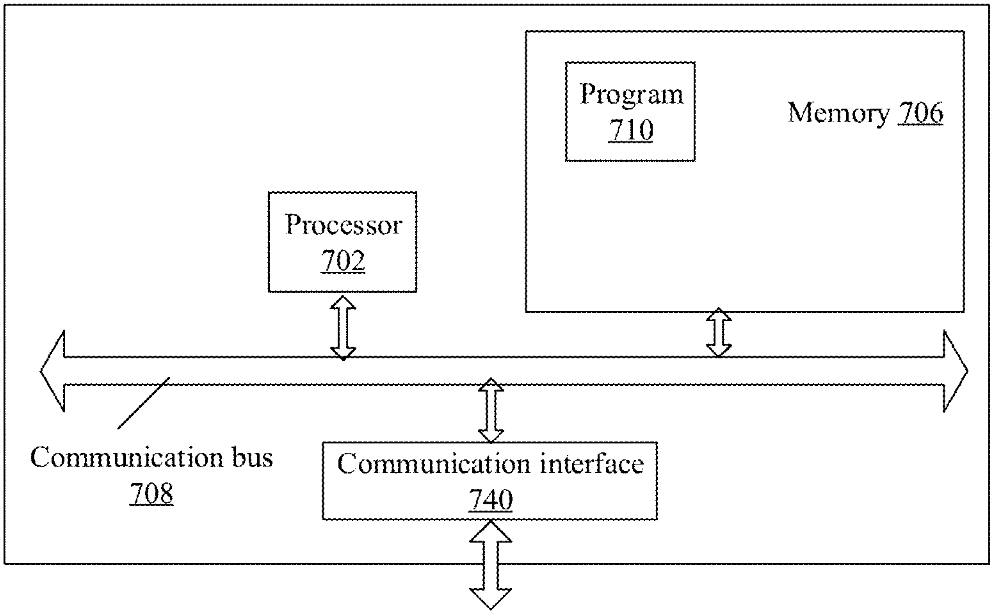
FIG. 7 is a structural diagram of an electronic device according to an embodiment of the present disclosure.

FIG. 7 illustrates a structural diagram of an electronic device according to another embodiment of the present disclosure. The specific embodiments of the present disclosure are not limited to the specific implementation of the electronic device.

As illustrated in FIG. 7, the electronic device may include a processor 702, a communication interface 704, a memory 706 storing a program 710, and a communication bus 708.

The processor, the communication interface and the memory communicate with each other through the communication bus.

The communication interface is configured to communicate with other electronic devices or servers.

The processor is configured to execute the program, and can specifically execute the related operations in the above method embodiments.

In particular, the program may include one or more program codes including computer operation instructions.

The processor may be a Central Processing Unit (CPU), or an Application Specific Integrated Circuit (ASIC), or one or more integrated circuits configured to implement embodiments of the present disclosure. A smart device includes one or more processors, which may be processors of the same type, such as one or more CPUs, or may also be different types of processors, such as one or more CPUs and one or more ASICs.

The memory is configured to store programs. The memory may include a high-speed RAM memory and may also include a non-volatile memory, such as at least one disk memory.

In particular, the program can be used to cause the processor to perform the following operations: dividing a target mowing area into a plurality of convex sub-areas; determining a main extension direction of each of the plurality of convex sub-areas as a mowing direction; determining mowing paths of the plurality of convex sub-areas based on the respective mowing directions of the plurality of convex sub-areas; and determining the mower path in the target mowing area based on the mowing paths of the plurality of convex sub-areas.

In addition, the specific implementation of each step in the program can be referred to the corresponding descriptions on the corresponding operations and units in the above method embodiments, and will not be repeated here. Those skilled in the art may clearly learn about that specific working processes of the device and module described above may refer to the corresponding processes in the method embodiments and will not be elaborated herein for convenient and brief description.

It should be noted that the each component/step described in the embodiments of the present disclosure may be divided into more components/steps, or two or more components/steps or partial operations of a component/step may be combined into new components/steps to achieve the purposes of the embodiments of the present disclosure, depending on requirements of the implementation.

The methods described above according to embodiments of the present disclosure may be implemented in hardware, firmware, or be implemented as software or a computer code that may be stored in a recording medium (such as a CD ROM, RAM, floppy disk, hard disk, or magneto-optical disk), or be implemented as a computer code that was downloaded by a network and originally stored in a remote recording medium or a non-temporary machine-readable medium and will be stored in a local recording medium, so that the methods described herein may be processed by software stored on a recording medium using a general purpose computer, a dedicated processor, or programmable or dedicated hardware such as ASIC or FPGA. It is to be appreciated that a computer, a processor, a microprocessor controller, or a programmable hardware includes a storage component (e.g., RAM, ROM, flash memory, etc.) that can store or receive software or computer code, and the method described herein is implemented when the software or computer code is accessed and executed by the computer, processor, or hardware. Further, when the general purpose computer accesses the code for implementing the method described herein, the execution of the code converts the general purpose computer into a dedicated computer for executing the method described herein.

Those of ordinary skill in the art may realize that various example units and method operations described in connection with the embodiments disclosed herein can be implemented in electronic hardware or a combination of computer software and electronic hardware. Whether these functions are performed in hardware or software depends on the specific application and design constraints of the technical solution. Professionals may realize the described functions for each specific application by use of different methods, but such realization shall fall within the scope of the disclosure.

The above implementations are only used to explain the embodiments of the present disclosure, and are not limited to the embodiments of the present disclosure. Any variations or modifications can be made by those skilled in the art without departing from the spirit and scope of the embodiments of the present disclosure, and all equivalent technical solutions shall fall within the scope of protection of the disclosure. The scope of protection of the disclosure shall be subject to the scope of protection of the claims.

The invention claimed is:

1. A method for determining a mower path, comprising:

controlling a mower provided with a positioning device to move and obtaining a plurality of mower positioning positions of the mower;

determining an area surrounding the plurality of mower positioning positions as a target mowing area;

determining an obstacle area in the target mowing area;

dividing the target mowing area into a plurality of convex sub-areas based on a boundary of the obstacle area and an outer boundary of the target mowing area;

determining a main extension direction of each of the plurality of convex sub-areas as a mowing direction;

determining mowing paths of the plurality of convex sub-areas based on the respective mowing directions of the plurality of convex sub-areas; and determining the mower path in the target mowing area based on the mowing paths of the plurality of convex sub-areas;

wherein dividing the target mowing area into the plurality of convex sub-areas based on the boundary of the obstacle area and the outer boundary of the target mowing area comprises:

determining a fitting boundary for the boundary of the obstacle area, wherein the fitting boundary has a direction consistency with the outer boundary of the target mowing area, determining an area to be divided surrounded by the fitting boundary and the outer boundary of the target mowing area, and dividing the area to be divided based on the direction consistency between the fitting boundary and the outer boundary of the target mowing area, to obtain the plurality of convex sub-areas; or determining a fitting polygon enclosing the obstacle area, determining an area to be divided surrounded by the fitting polygon and the outer boundary of the target mowing area, and dividing the area to be divided into the plurality of convex sub-areas based on a plurality of vertices of the fitting polygon.

2. The method of claim 1, wherein determining the main extension direction of each of the plurality of convex sub-areas as the mowing direction comprises:

determining an envelope rectangle of each of the plurality of convex sub-areas; and determining a long side direction of the envelope rectangle as the mowing direction.

3. The method of claim 1, wherein determining the mower path in the target mowing area based on the mowing paths of the plurality of convex sub-areas comprises:

determining a mower moving path among the plurality of convex sub-areas; and connecting the mowing paths of the plurality of convex sub-areas with the mower moving path to obtain the mower path in the target mowing area.

4. The method of claim 3, wherein determining the mower moving path among the plurality of convex sub-areas comprises:

determining a starting point and an ending point of a mowing path of each of the plurality of convex sub-areas; and connecting starting points and ending points of different convex sub-areas to obtain the mower moving path.

5. The method of claim 4, wherein connecting the starting points and the ending points of the different convex sub-areas to obtain the mower moving path comprises:

connecting the starting points and the ending points of the different convex sub-areas to obtain a plurality of candidate mower moving paths; and selecting an optimal mower moving path from the plurality of candidate mower moving paths as the mower moving path.

6. The method of claim 5, wherein connecting the starting points and the ending points of the different convex sub-areas to obtain the plurality of candidate mower moving paths, and selecting the optimal mower moving path from the plurality of candidate mower moving paths as the mower moving path comprises:

determining a current sub-area among the plurality of convex sub-areas;

determining a starting point and an ending point of the current sub-area;

determining an unsearched sub-area having a starting point closest to the ending point of the current sub-area as a next sub-area;

recording a moving subpath obtained by connecting the ending point of the current sub-area with the starting point of the next sub-area;

updating the current sub-area based on the next sub-area, until there is no unsearched sub-area; and determining the mower moving path based on the recorded moving subpaths.

7. The method of claim 1, wherein dividing the area to be divided based on the direction consistency between the fitting boundary and the outer boundary of the target mowing area, to obtain the plurality of convex sub-areas comprises:

determining at least one reference line having direction consistency with the fitting boundary and the outer boundary of the target mowing area; and dividing the area to be divided into the plurality of convex sub-areas based on the at least one reference line.

8. An electronic device, comprising:

a processor; and a memory for storing a computer program, wherein the processor is configured to call and run the computer program stored in the memory to cause the electronic device to:

control a mower provided with a positioning device to move and obtain a plurality of mower positioning positions of the mower;

determine an area surrounding the plurality of mower positioning positions as a target mowing area;

determine an obstacle area in the target mowing area;

divide the target mowing area into a plurality of convex sub-areas based on a boundary of the obstacle area and an outer boundary of the target mowing area;

determine a main extension direction of each of the plurality of convex sub-areas as a mowing direction;

determine mowing paths of the plurality of convex sub-areas based on the respective mowing directions of the plurality of convex sub-areas; and determine the mower path in the target mowing area based on the mowing paths of the plurality of convex sub-areas;

wherein the processor is further configured to call and run the computer program to cause the electronic device to:

determine a fitting boundary for the boundary of the obstacle area, wherein the fitting boundary has a direction consistency with the outer boundary of the target mowing area, determine an area to be divided surrounded by the fitting boundary and the outer boundary of the target mowing area, and divide the area to be divided based on the direction consistency between the fitting boundary and the outer boundary of the target mowing area, to obtain the plurality of convex sub-areas; or determine a fitting polygon enclosing the obstacle area, determine an area to be divided surrounded by the fitting polygon and the outer boundary of the target mowing area, and divide the area to be divided into the plurality of convex sub-areas based on a plurality of vertices of the fitting polygon.

9. The electronic device of claim 8, wherein the processor is configured to call and run the computer program to cause the electronic device to:

determine an envelope rectangle of each of the plurality of convex sub-areas; and determine a long side direction of the envelope rectangle as the mowing direction.

10. The electronic device of claim 8, wherein the processor is configured to call and run the computer program to cause the electronic device to:

determine a mower moving path among the plurality of convex sub-areas; and connect the mowing paths of the plurality of convex sub-areas with the mower moving path to obtain the mower path in the target mowing area.

11. The electronic device of claim 10, wherein the processor is configured to call and run the computer program to cause the electronic device to:

determine a starting point and an ending point of a mowing path of each of the plurality of convex sub-areas; and connect starting points and ending points of different convex sub-areas to obtain the mower moving path.

12. A non-transitory computer storage medium having stored thereon a computer program that, when executed by a processor, causes the processor to implement a method for determining a mower path, comprising:

controlling a mower provided with a positioning device to move and obtaining a plurality of mower positioning positions of the mower;

determining an area surrounding the plurality of mower positioning positions as a target mowing area;

determining an obstacle area in the target mowing area;

dividing the target mowing area into a plurality of convex sub-areas based on a boundary of the obstacle area and an outer boundary of the target mowing area;

determining a main extension direction of each of the plurality of convex sub-areas as a mowing direction;

determining mowing paths of the plurality of convex sub-areas based on the respective mowing directions of the plurality of convex sub-areas; and determining the mower path in the target mowing area based on the mowing paths of the plurality of convex sub-areas;

wherein dividing the target mowing area into the plurality of convex sub-areas based on the boundary of the obstacle area and the outer boundary of the target mowing area comprises:

determining a fitting boundary for the boundary of the obstacle area, wherein the fitting boundary has a direction consistency with the outer boundary of the target mowing area, determining an area to be divided surrounded by the fitting boundary and the outer boundary of the target mowing area, and dividing the area to be divided based on the direction consistency between the fitting boundary and the outer boundary of the target mowing area, to obtain the plurality of convex sub-areas; or determining a fitting polygon enclosing the obstacle area, determining an area to be divided surrounded by the fitting polygon and the outer boundary of the target mowing area, and dividing the area to be divided into the plurality of convex sub-areas based on a plurality of vertices of the fitting polygon.

* * * * *